May 2, 1933.  S. S. GREEN  1,906,927
WATTHOUR ELECTRICITY METER
Filed July 11, 1929   2 Sheets-Sheet 1
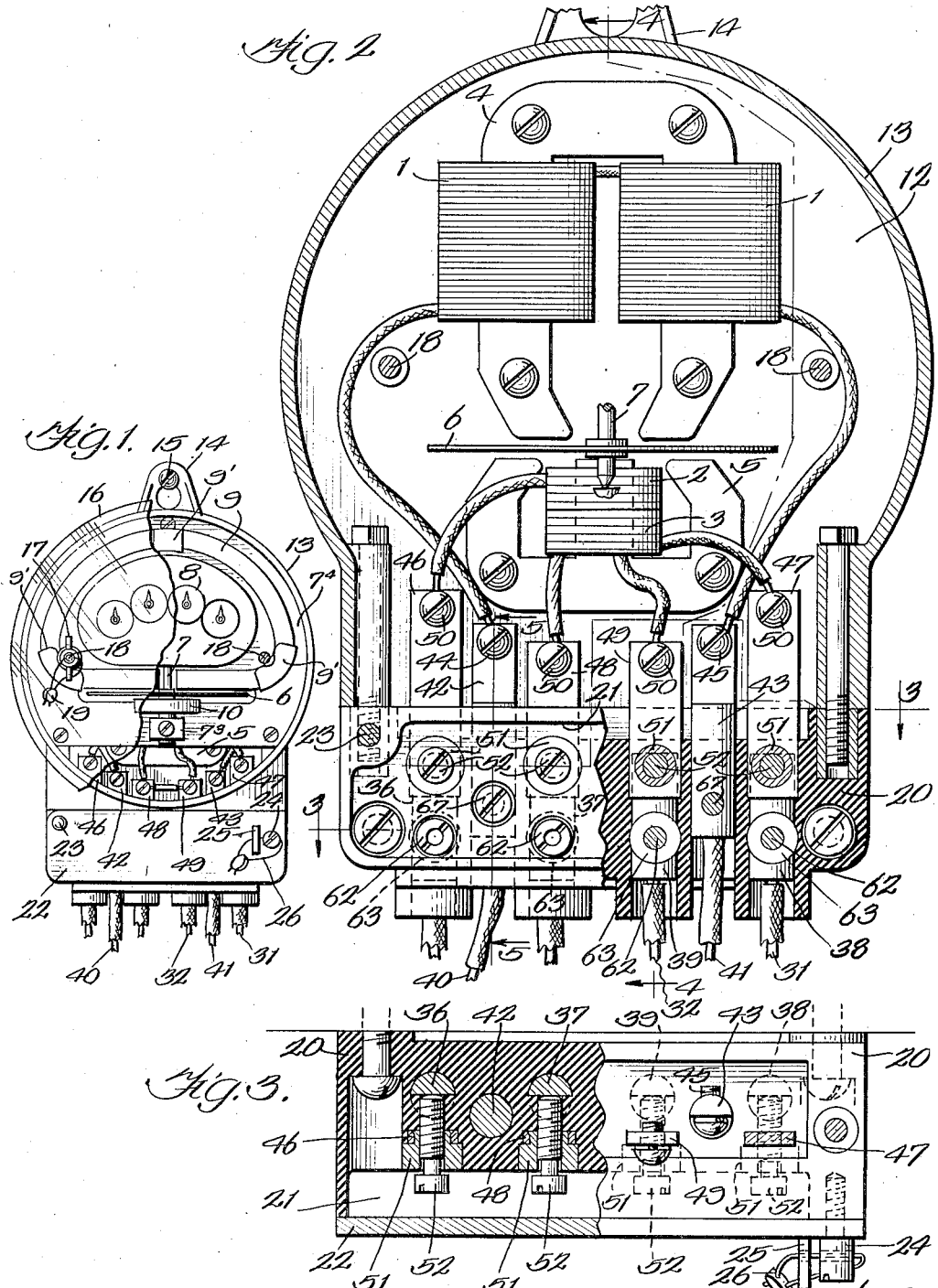

May 2, 1933. S. S. GREEN 1,906,927
WATTHOUR ELECTRICITY METER
Filed July 11, 1929 2 Sheets-Sheet 2
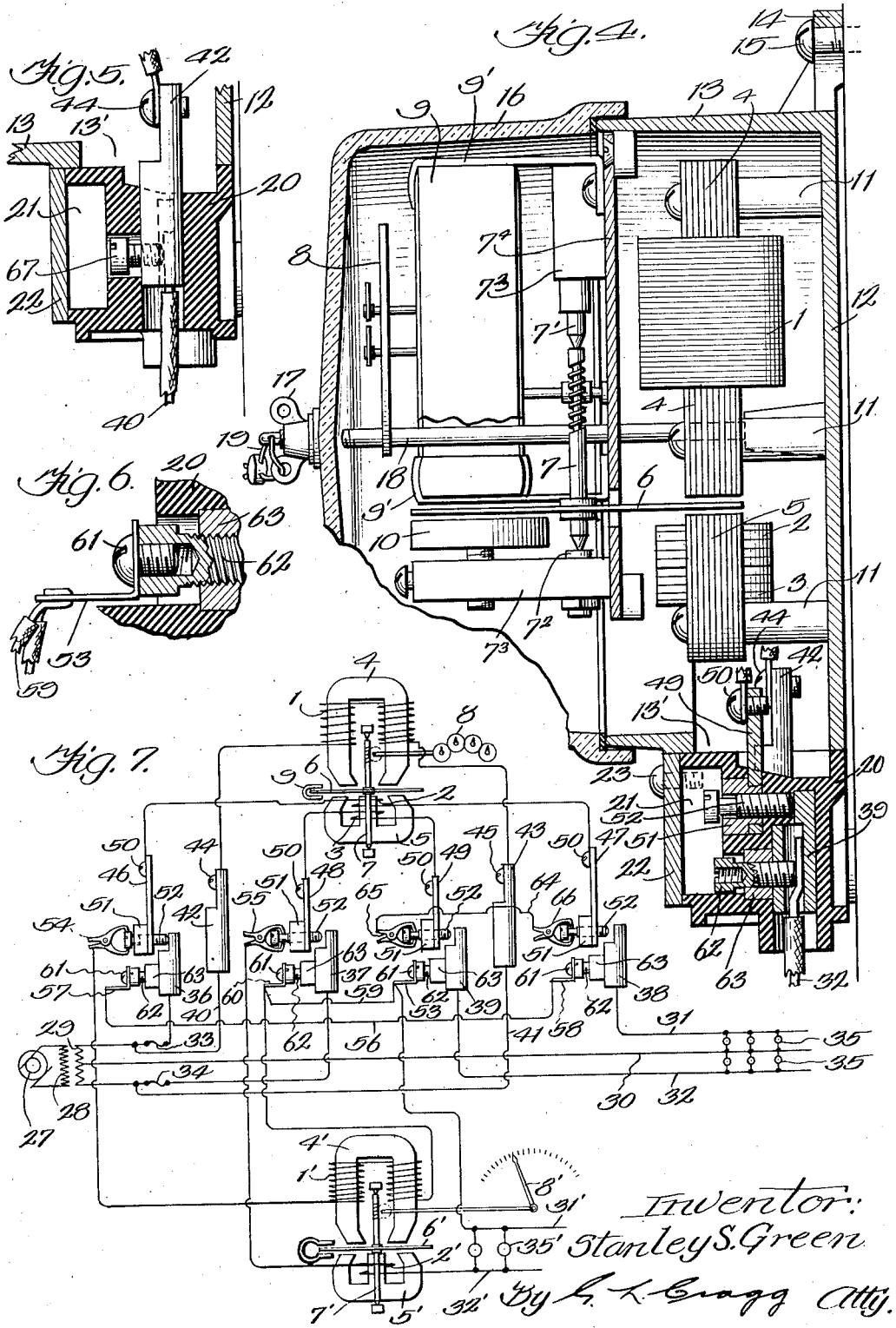

Patented May 2, 1933

1,906,927

UNITED STATES PATENT OFFICE

STANLEY S. GREEN, OF LA FAYETTE, INDIANA, ASSIGNOR TO DUNCAN ELECTRIC MANUFACTURING COMPANY, OF LA FAYETTE, INDIANA, A CORPORATION OF ILLINOIS

WATTHOUR ELECTRICITY METER

Application filed July 11, 1929. Serial No. 377,490.

My invention relates to terminal structures for electricity service watthour meters and to circuit connectors adapted for use therein as well as for use in other relations.

The structure of my invention is inclusive of mounted terminals with which the wiring of the line and load circuits may be connected, other mounted terminals with which the current winding element of the service meter may be connected and spaced apart from the first terminals respectively complemental thereto, and means for separably connecting the complemental terminals to enable various associations of a standard test meter with the service meter. My invention in its preferred embodiment is also inclusive of a body of insulating material constituting a mounting for the various terminals and making the structure a terminal block. This insulating body has moulded or inserted therein the meter terminals and the line and load terminals that are respectively complemental to the meter terminals. All of the line and load and meter current winding terminals are arranged in two sets that are in lapping relation, all of the meter current winding terminals being preferably arranged in one set and all of the line and load circuit terminals in the other set. These two sets of terminals that are in lapping relation are spaced apart, passages being provided in the insulating body for the reception of connecting devices, such as metallic screws, which may be screwed into the terminals of one set and into engagement with the corresponding terminals of the other set. The meter current winding terminals being preferably provided with these screws, such screws are so proportioned and positioned that when they are in circuit connecting position or backed therefrom clips may be applied to such screws in a manner to enable the inclusion of a standard testing meter in circuit with the service meter. The line and load terminals are provided with means for clamping line and load wire ends into mechanical and electrical connection therewith. These means are preferably also in the form of screws and the line and load terminals are preferably in the form of sleeves that receive the line and load wire ends which may be clamped upon by these screws. The outer ends of the latter screws are desirably provided with threaded bores for the reception of binding screws which may clamp current conducting clips into electrical engagement with these screws, these clips constituting the ends of jumpers. This arrangement permits the maintenance of the continuity of the connection between the line and load circuits upon disconnection of the current windings of the meter and when such disconnection is effected for testing or other purposes. The body of insulating material that is included in the formation of the testing block has a portion thereof chambered to afford access to the heads of the normally positioned screws when the separable and normally sealed cover, that is supplied to this chamber, is removed. The line and load circuit terminals of sleeve formation may be made of copper tubing, the bores of these terminals being desirably coaxial with the exterior surfaces of these terminals, a formation which is permitted by the provision of enlargements, preferably made of brass, for the sleeves, which are moulded or inserted in the insulating body and which enlargements are threaded to receive the screws that pass into connection with the line and load circuit wire ends, an improvement on prior connectors of this type which were in the form of tubes whose bores were eccentric with respect to the exterior surfaces of the tubes to afford sides for the tubes sufficiently thickened to receive threads and withstand the thrusts of the screws received by such threads.

The terminal block of my invention may be directly assembled with the service electricity meter to constitute a closure for an opening in the casing of the meter through which opening the meter windings are brought into circuit relation with the line and load circuit wires. The terminal block of my invention is not to be limited, however, to its use as such a closure.

I will explain my invention more fully by reference to the accompanying drawings in which Fig. 1 illustrates the preferred embodiment thereof as employed in connection with a single phase alternating current watthour meter; Fig. 2 is a sectional elevation of the meter shown in Fig. 1, on a larger scale; Fig. 3 is a sectional view on line 3—3 of Fig. 2; Fig. 4 is a sectional view on line 4—4 of Fig. 2; Fig. 5 is a sectional view on line 5—5 of Fig. 2; Fig. 6 is an enlargement of a portion of the load circuit terminal illustrated in Fig. 2 with the terminal of the jumper applied to the clamping screw that is threaded into engagement with this terminal; and Fig. 7 is a diagram illustrating one circuit arrangement.

The meter illustrated, particularly in Fig. 7, is a single phase three wire six terminal watthour induction meter. The meter is inclusive of a motor magnet system employing a pressure winding 1 and two current windings 2 and 3. The pressure winding is divided into two coils arranged upon the limbs of a U shaped core 4. The two current windings are disposed upon the middle leg of an E shaped core 5. A closed conductor armature, usually in the form of an aluminum disc 6, is arranged in the gaps between the poles of the two cores, and upon a rotatably mounted upright spindle 7. This spindle is in suitable driving relation to the counting train 8. A damping permanent magnet 9 has its poles arranged upon the upper side of the armature disc 6, there being an iron keeper 10 upon the lower side of this disc for directing motion damping flux from the magnet through the disc. The motor magnets may be mounted upon horizontal posts 11 which project forwardly from the upright back wall 12 of a meter casing which is inclusive of a generally cylindrical wall 13 that projects forwardly from the back wall. A perforated lug 14 is provided upon the upper portion of the parts 12 and 13 to receive a mounting screw 15 by which the meter may be secured in position. A cover 16, preferably of glass, is supplied to the meter, this cover being secured in place by means of wing nuts 17 screwed upon rods 18 that are carried by and project forwardly from the back wall 12 of the meter casing. Sealing wires 19 are passed through holes provided in the wing nuts and rods. The meter spindle 7 is disposed between vertically aligned bearings 7' and 7² which are respectively carried upon brackets 7³ which, themselves, are carried upon a mounting plate 7⁴ which is suitably assembled with the forward portion of the casing part 13. These brackets, the spindle and the spindle bearings are in front of the mounting plate as are also the damping magnet 9 and the counting train. The damping magnet is carried upon brackets 9' which are carried by and project forwardly and horizontally from the mounting plate 7⁴. The keeper 10 is also disposed in front of said mounting plate and in line with the permanent magnet, this keeper being disposed upon the lower bracket 7³. The meter casing portion 13 is provided with an opening 13' at the bottom thereof and through which the meter windings are brought into connection with the line and load circuits. This opening is desirably sealed by the terminal block of my invention, this terminal block being inclusive of a body 20 formed of bakelite or other suitable insulating material. This insulating block is formed with a recess 21 providing a chamber affording access to terminals that are employed in establishing connection between the meter and the line and load circuits for the purpose of testing, as will more fully hereinafter appear. This terminal chamber is closed by a closure plate 22, preferably metallic. This closure plate is held in place by fasteners 23 and 24 that pass therethrough into holding connection with the insulating body 20. The closure plate carries a lug 25. The sealed wire 26 passes through perforations provided in the screw 24 and said lug.

The single phase alternating current generator 27 supplies current to the primary transformer winding 28. This transformer winding is in inducing relation to the secondary transformer winding 29. This secondary winding has two end terminals and an intermediate terminal. The load conductor 30 is illustrated as being in permanent firm connection with the intermediate terminal of the winding 29. The load conductor 31 is adapted for connection with the upper terminal of the secondary winding 29 through the current winding 2 of the service meter. The load conductor 32 is adapted for connection with the lower terminal of the secondary winding through the current winding 3 of said meter. A fuse 33 is interposed between the top terminal of the secondary winding 29 and the current winding 2 and a fuse 34 is interposed between the bottom terminal of the secondary winding and the current winding 3. The load is illustrated in the form of incandescent electric lamps 35, a portion of these lamps being bridged across the conductors 30 and 31 and the remaining portion between the conductors 30 and 32. The line sides which are connected with the secondary winding 29 are provided with terminals 36 and 37. The load conductors 31 and 32 are provided with terminals 38 and 39. Legs 40 and 41 are branched from the line conductors that extend from the top and bottom terminals of the secondary winding 29. These legs have terminals 42 and 43. These terminals also constitute the terminals for the pressure winding 1 of the service meter. These terminals have tubular portions in which the adjacent ends of the wires 40 and 41 are received and flattened portions which receive binding screws 44 and 45 by which the pressure winding 1 of the service meter is connected between said terminals 42 and 43. This pressure winding is thus connected across the outside line wires that extend from the top and bottom terminals of the secondary transformer winding. These particular terminals form no essential part of my present invention.

The terminals for the current winding 2 of the service meter are inclusive of metallic strips 46 and 47, preferably brass, and the terminals for the current winding 3 of said meter are inclusive of other metallic strips 48 and 49, which are also preferably of brass. Binding screws 50 clamp the ends of the wiring of these current windings into connection with the terminals 46, 47, 48 and 49 pertaining thereto. Each of the terminal strips 46, 47, 48 and 49 is provided with an enlargement 51 that may be in the form of a short tube of brass staked into engagement with the corresponding strip as illustrated in Fig. 4. The set of terminals 46, 47, 48 and 49 are in lapping relation with the set of terminals 36, 37, 38 and 39, the lower ends of the former terminals that carry the enlargements 51 being abreast of the upper ends of the latter terminals. Screws 52 are screwed through the terminals of the former set into and out of engagement with the terminals of the latter set, as desired. When these screws are brought into engagement with the terminals of the latter set, the current meter winding 2 is in series with the load side 31 and the line side extending from the top terminal of the secondary 29 and the current winding 3 is in series with the load side 32 and the line side extending from the bottom terminal of said secondary.

The standard test meter illustrated is generally similar to the service meter, similar parts being given similar characters of reference with added prime exponents. Instead of integrating counting mechanism I employ a swinging pointer 8' which is swung by the rotation of the spindle 7 through the intermediation of suitable gearing. I provide an artificial load 35' between the sides 31', 32' of the load circuit. The pressure winding 1' has one terminal in the form of a clip 60 and its other terminal in the form of a gripper 54. One terminal of the current winding 2' is in permanent connection with the artificial load side 32'. The other terminal of this current winding is in the form of another gripper 55. A jumper 56 may be employed having terminal clips 57 and 58 similar to the terminal clip 53. Another jumper 59 may be employed having clip 53 for one of its terminals and a clip 60 for the other of its terminals. Binding screws 61 may be passed through the clips 53, 57, 58 and 60 into the threaded bores provided in the outer ends of the binding screws 62. These binding screws are screwed through tubular enlargements 63, preferably of brass, of the line terminals 36, and 37 and the load terminals 38 and 39. These four terminals may be made of copper and may be tubular with the bores of the tubes coaxial with the exterior surfaces of the tubes, a lighter weight of tubes for these terminals being permissible because their lateral enlargements 63 take the thrusts of the screws that pass through these enlargements into engagement with the wire ends that are received in the bores of such tubes. Another jumper 64 instead of having terminal clips similar to clips 53 etc. has terminals in the form of grippers 65, 66. The various terminals 53, 54, 55, 57, 58, 60, 65 and 66 may be applied as desired to secure the various circuit interrelations of the testing meter with the service meter and the circuits normally associated therewith as will be understood by those familiar with the art. It may be said, however, that jumpers 56, 59 and 64 are employed in the circuit relations illustrated for certain of the testing operations, the normal load 35 then remaining in circuit when the current windings 2 and 3 are disconnected therefrom.

My invention, as it is preferably practiced, is inclusive of an insulating body 20, hitherto referred to, in which the meter terminals 42, 43, 46, 47, 48 and 49 and the lateral enlargements 51 pertaining to some of these terminals are inserted or moulded. The line terminals 36 and 37 and the load terminals 38 and 39, together with their lateral enlargements 63, are also inserted or moulded in this insulating body. Passages are afforded in this insulating body through which the screws 52 are snugly passed from the meter terminals 46, 47, 48 and 49 into engagement with the complemental terminals 36, 38, 37 and 39, the terminals of the first set being in lapping relation to the terminals of the second set and the terminals of each set being preferably substantially parallel to the terminals of the other, while said screws are transversely arranged to the terminals of both sets. The heads of the screws 52 and 62 are exposed, for engagement, within the chamber 21 in the insulating body 20 in all positions of these screws while they remain assembled with the parts 51 and 63 that carry them. In the preferred embodiment of the invention, the portions of the terminals 36, 37, 38 and 39 which are engaged by the screws 52 are formed by cutting away the upper ends of these terminals and upsetting these ends as illustrated most clearly in Fig. 4. While the pressure winding terminals 42 and 43 form no essential part of my invention, yet it may be said that they are preferably provided with binding screws 67 which are received in passages formed in the insulating body 20 and are passed laterally through these terminals into engagement with the ends of the legs 40 and 41 that are received in the hollow interiors of these terminals.

While I have herein shown and described a single phase three wire induction electricity watthour meter with which my invention may be practiced, I do not wish to be limited to such a use of the invention.

Changes may be made without departing from the invention.

Having thus described my invention, I claim:

Watthour meter connections inclusive of a terminal block, a line wire terminal and a current coil terminal each fixed to the block, said terminals being spaced apart and overlapping each other, and a terminal connecting screw carried by the current coil terminal and movable back and forth across the space between the terminals into and out of contact with the line terminal, said screw being out of engagement at all times with all current carrying elements normally associated with a meter other than said terminals and being accessible for engagement by test connections while carried by the current coil terminal and out of contact with the line terminal.

In witness whereof, I hereunto subscribe my name.

STANLEY S. GREEN.